(12) United States Patent
Ottliczky et al.

(10) Patent No.: US 9,670,871 B2
(45) Date of Patent: Jun. 6, 2017

(54) TWO-PART STEEL PISTON FOR INTERNAL COMBUSTION ENGINES

(75) Inventors: Emmerich Ottliczky, Forchtenberg-Ernsbach (DE); Franz Ratzky, Dallau (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 0 days.

(21) Appl. No.: 14/348,330

(22) PCT Filed: Sep. 14, 2012

(86) PCT No.: PCT/EP2012/068062
§ 371 (c)(1),
(2), (4) Date: Jun. 30, 2014

(87) PCT Pub. No.: WO2013/045289
PCT Pub. Date: Apr. 4, 2013

(65) Prior Publication Data
US 2014/0305401 A1 Oct. 16, 2014

(30) Foreign Application Priority Data
Sep. 28, 2011 (DE) .......................... 10 2011 083651

(51) Int. Cl.
*F02F 3/00* (2006.01)
*F02F 3/16* (2006.01)
(Continued)

(52) U.S. Cl.
CPC ................. *F02F 3/16* (2013.01); *F02F 3/22* (2013.01); *F16J 1/09* (2013.01);
(Continued)

(58) Field of Classification Search
CPC ................. F02F 3/0076; F02F 3/0015; F02F 2003/0061; F02F 3/22; F05C 2201/0448
(Continued)

(56) References Cited

U.S. PATENT DOCUMENTS 6,691,666 B1 * 2/2004 Berr et al. ................. 123/193.6
6,698,391 B1 * 3/2004 Kemnitz .................... 123/193.6
(Continued)

FOREIGN PATENT DOCUMENTS

DE        3116475 A1    4/1982
DE   102006022413 A1   11/2007
(Continued)

*Primary Examiner* — Marguerite McMahon
(74) *Attorney, Agent, or Firm* — Young Basile Hanlon & MacFarlane, P.C.

(57) ABSTRACT

A method for producing a piston for an internal combustion engine, which piston has at least one cooling channel and is produced from at least one upper part and one lower part. The cooling channel of the piston is formed of the upper part and the lower part where the upper part and the lower part of the piston are each produced by means of a forging process At least one rib-like element, in particular, at least one rib, is additionally forged during the forging of the upper part in an area of the cooling channel and/or at least one rib-like element, in particular, at least one rib, is additionally forged during the forging of the lower part in an area of the cooling channel. Two alternative production methods and to a piston for an internal combustion engine are disclosed.

18 Claims, 3 Drawing Sheets

(51) Int. Cl.
*F02F 3/22* (2006.01)
*F16J 1/09* (2006.01)

(52) U.S. Cl.
CPC ... *F02F 2003/0061* (2013.01); *F02F 2200/00* (2013.01); *F02F 2200/04* (2013.01); *Y10T 29/49252* (2015.01)

(58) Field of Classification Search
USPC .......................................... 123/193.6, 41.35
See application file for complete search history.

(56) References Cited

U.S. PATENT DOCUMENTS

| | | |
|---|---|---|
| 6,698,392 B1* | 3/2004 | Kohnert et al. ........... 123/193.6 |
| 2006/0037471 A1 | 2/2006 | Zhu |
| 2010/0258064 A1* | 10/2010 | Rebello ...................... 123/41.35 |
| 2011/0030645 A1* | 2/2011 | Rebello et al. ............ 123/193.6 |
| 2011/0146074 A1 | 6/2011 | Ribeiro |
| 2012/0000439 A1* | 1/2012 | Scharp et al. ............. 123/193.6 |
| 2012/0304956 A1* | 12/2012 | Wang et al. ................ 123/193.6 |
| 2013/0008407 A1* | 1/2013 | Issler et al. ................ 123/193.6 |
| 2014/0020648 A1* | 1/2014 | Azevedo et al. .......... 123/193.6 |

FOREIGN PATENT DOCUMENTS

| | | |
|---|---|---|
| DE | 102009032916 A1 | 5/2010 |
| JP | 58101250 A | 6/1983 |

* cited by examiner

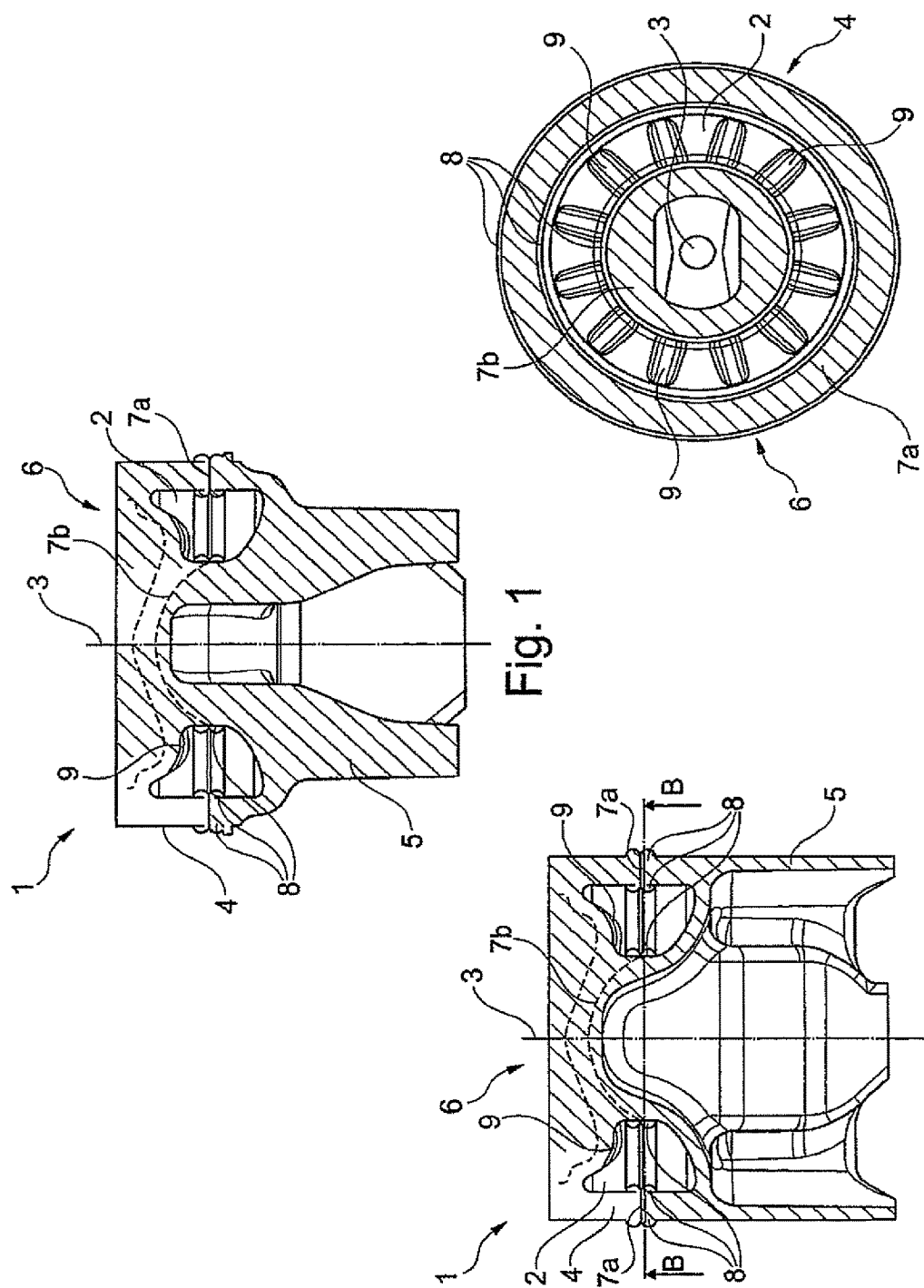

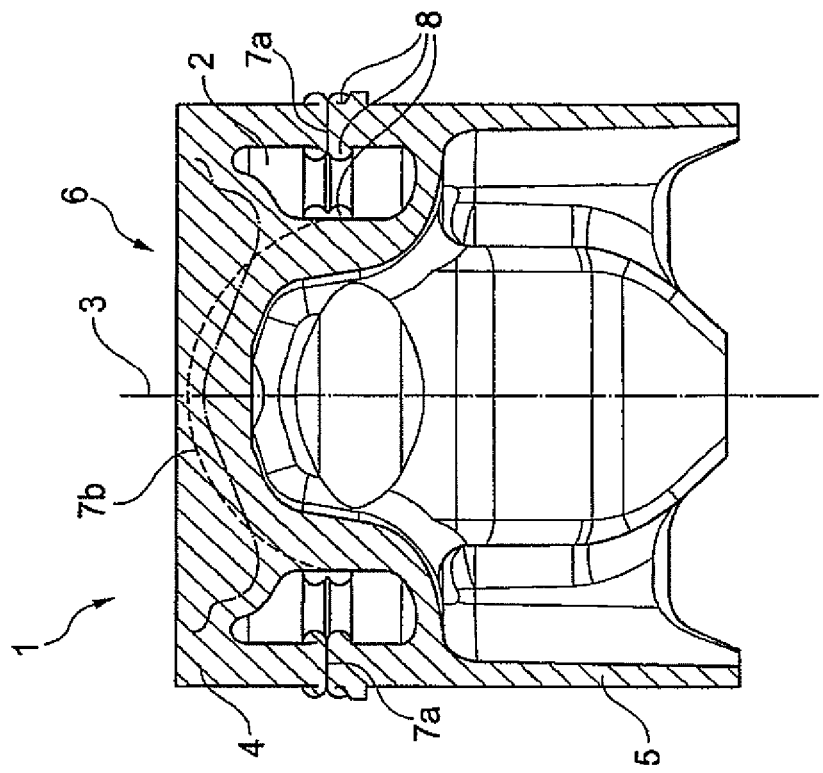
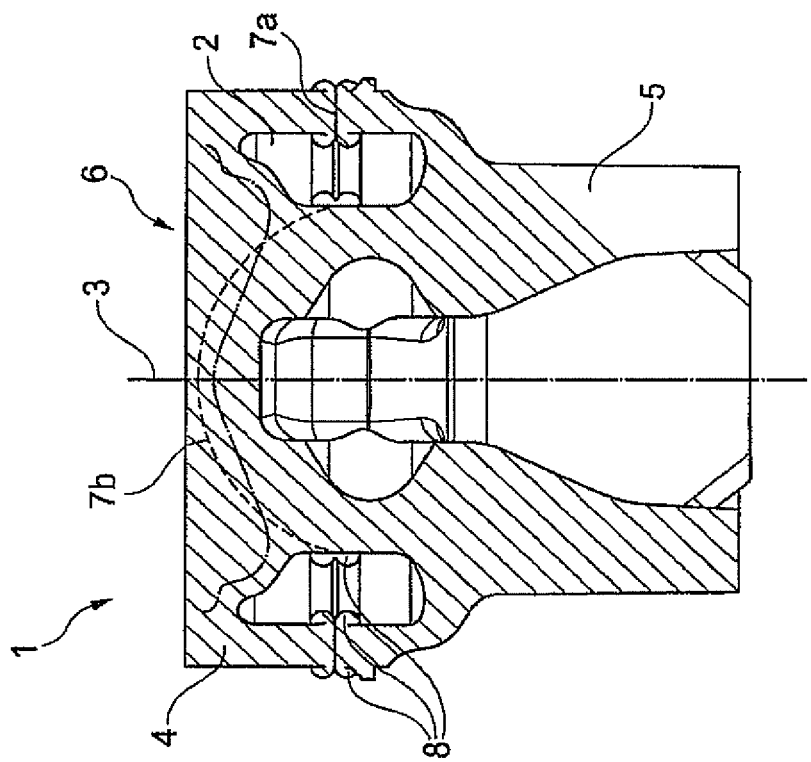

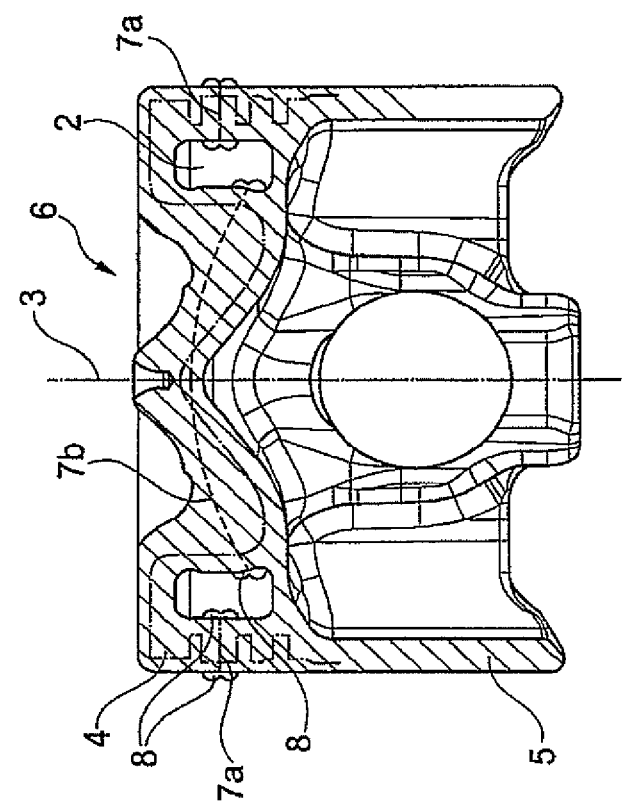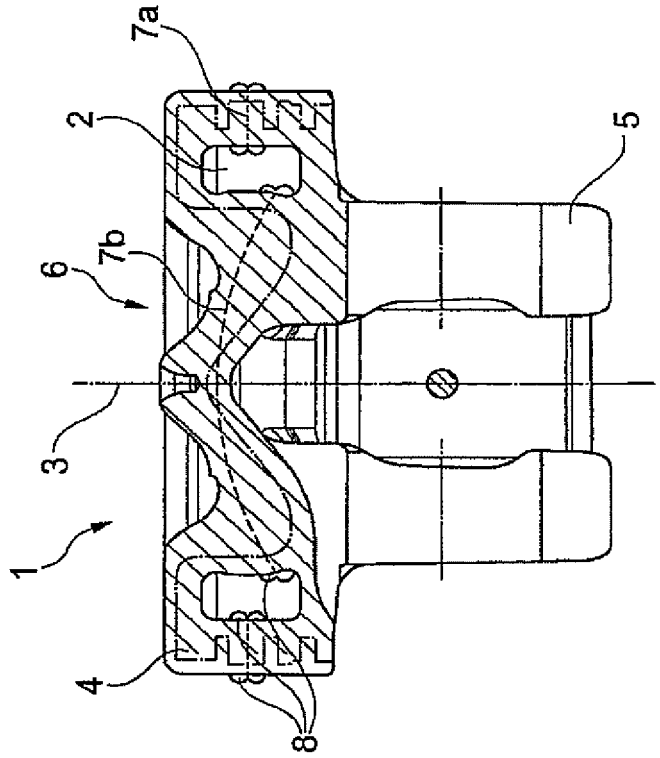

TWO-PART STEEL PISTON FOR INTERNAL COMBUSTION ENGINES

BACKGROUND

The disclosure relates to a method for producing a piston having at least one cooling channel for an internal combustion engine that is produced from at least one upper part and one lower part, wherein the cooling channel of the piston is formed using the upper part and the lower part, and the upper part and the lower part are produced employing a forging process.

A liquid-cooled piston for an internal combustion engine is known from DE 10 2006 022 413 B4 that comprises a radially circumferential ring carrier cooling channel. The ring carrier cooling channel consists of a cooling channel spaced apart from the piston crown and a ring carrier intended to receive a piston ring, wherein the cooling channel is formed directly to the ring carrier on its internal side over its entire circumference. Further, the cooling channel includes at least one inlet orifice and at least one outlet orifice through which a cooling medium can flow in or out, respectively. The cooling channel of the ring carrier cooling channel, produced without machining, has a geometrically structured wall for stiffening that includes geometrically identical and repeating or alternating structures facing inward, wherein the cooling channel has formed ribs on the inner wall offset to each other and extending in a cross-sectional plane across the entire inner wall of the annular channel.

The disadvantage of this type of piston for an internal combustion engine known from the prior art is that the ring carrier cooling channel for stiffening is complex and therefore expensive to produce. The result is increased production costs for a piston that has a ring carrier cooling channel with a geometrically structured wall.

It would be desirable to create a potential by means of which a piston can be produced simply and cost-effectively and which avoids the aforementioned disadvantages.

This potential is achieved by additionally forging at least one rib-like element, specifically at least one rib, at the same time as the forging of the upper part in one area of the cooling channel of the upper part, and/or during the forging process for the lower part in one area of the cooling channel, at least one rib-like element, specifically at least one rib, is also forged. A fully forged cooling channel shape is thusly created.

An alternative way of achieving this potential is that during the forging of the upper part in one area of the cooling channel of the upper part at least one additional rib-like element, in particular at least one rib, is forged at the same time.

A further alternative is that during the forging of the lower part in one area of the cooling channel of the lower part at least one rib-like element, specifically at least one rib, is forged at the same time.

It is advantageous that cost-effective production of the piston by means of this method is possible by forging rib-like elements in the form of stiffening or reinforcing ribs directly during the forging process for the upper part and/or the lower part in the area of the cooling channel. Machining of the cooling channel cavity can be dispensed with after the upper part and/or the lower part of the piston is forged. Because both the reinforcements in the area of the cooling channel are forged simultaneously with the forging of the attendant upper and/or lower part, net shape forging is possible. In addition, it is possible using the method to optimize cooling of the piston during operation in an internal combustion engine. As a result of the enlarged surface resulting from the shape of the rib-like elements formed as cooling ribs in the cooling channel, improved cooling efficiency in the piston is possible. Furthermore, the flow of coolant in the piston and its movement in the piston is improved so that cooling efficiency in the piston is also improved as a result. It is further advantageous that the cooling channel is stiffened as a result of the rib-like elements in the area of the cooling channel, specifically the cooling channel crown is stiffened. Piston deformation during operation of the piston in an internal combustion engine can be reduced. As a result of the stiffening in the form of rib-like elements in the area of the cooling channel crown, an improved stress situation in the area of the cooling channel crown is achieved. The cooling channel crown is the area of the piston that forms a maximum in the cooling channel with reference to the piston stroke axis towards the combustion chamber, where the cooling channel crown is usually the highest point in the cooling channel and thus lies in the area of the upper part. The piston produced in accordance with the method has high ignition pressure load capacity with simultaneous good cooling of the piston with and without bracing of the outer ring zone. In addition, pistons with a lower compression height can be produced.

The rib-like element can be forged perpendicular to the circumferential direction of the cooling channel. By forging the rib-like element into the cooling channel perpendicular to the circumferential direction of the piston cooling channel, it is possible, for example, for the flow of coolant, cooling oil for example, entering the cooling channel by means of an inlet orifice during operation of the piston in an internal combustion engine to be speeded up or slowed down optimally because of the perpendicular forging until the coolant leaves the cooling channel by means of an outlet orifice. Improved cooling of the piston during operation is possible by means of the speeding up or slowing down of coolant flow. If the cooling channel has several rib-like elements that are forged in the appropriate upper part and/or appropriate lower part perpendicular to the circumferential direction of the cooling channel, the resulting arrangement with reference to the piston center point is a star shape.

The upper part and the lower part can be connected by means of a joining process, specifically by means of friction welding, to produce the piston. As a result, it is possible that the area below a combustion bowl of the piston and the area in which the later ring grooves are located can be joined optimally and simply. The piston can thus be produced easily and cost-effectively.

When forging the upper part and/or the lower part, at least two weld supports are forged at the same time, specifically an external support and a central support. An external support is the area that is located in the area of the later ring grooves and connects the outer sides of the piston, i.e. the outer side of the upper part and of the lower part. The external support is at a constant radial distance completely circumferential around the piston stroke axis of the upper part and the lower part. A central support is a central area of the piston around the piston stroke axis, in which the piston upper part is also joined to the piston lower part. The central support is also known by the term "central link".

The upper part and the lower part thus lie on top of each other in the area of the external support and in the area of the central support and are joined simultaneously by means of friction welding in the area of the external support and of the central support. In the respective area of the weld support, a weld plane is formed, where the weld plane of the external support and the weld plane of the central support may lie in the same weld plane or may lie in different weld planes. It is further possible that the respective weld planes of the external support and of the central support are executed curved and/or flat when the piston is produced. By means of the central support in particular, it is possible to vary the weld plane geometry so that the load-critical friction weld seams are positioned in non-critical load planes of the subsequently produced piston.

The weld plane is not restricted to a flat surface but refers to a plane that may follow any kind of course. Several weld planes can be combined into a single, common weld plane, where the course of the individual, common weld plane is compose of the course of the several weld planes.

Following the joining of the upper part and lower part, the cooling channel of the piston is formed between the central support and the external support.

In an advantageous aspect, the piston consists of a steel material. Alternatively, it is possible that the piston consists of a light-alloy material, for example, aluminum, an aluminum alloy, a magnesium alloy, or similar. It is further possible that the piston, consisting of an upper part and a lower part, consists of different materials, for example, the upper part consists of a steel material and the lower part of a light-alloy material (or conversely).

In a further aspect, the piston has at least one rib-like element, specifically at least one rib, in the cooling channel. If the cooling channel of the piston has several rib-like elements, it is possible that the elements are shaped geometrically the same in the piston, i.e. the elements have recurring geometrical structures and/or shapes. Alternatively, or supplementally, it is possible that the rib-like elements in the cooling channel have alternating structures and/or shapes.

A geometrically identical structure is given, for example, if the distance between the rib-like elements in the cooling channel is the same with reference to the radial periphery in the piston. An alternating structure is given, for example, if the array of rib-like structures in the cooling channel is arranged with a different distance to each other in the radial periphery of the cooling channel so that areas with a higher density of rib-like elements and areas with a lower density result. A recurring geometrical design, for example, is formed in the piston when the rib-like elements all have the same shape. An alternating design is formed in the piston, for example, when the rib-like elements each has a different shape.

It is furthermore possible that the rib-like elements extend out of the cooling channel so that a type of elevation results in the cooling channel, or alternatively extend into the cooling channel so that valleys result in the cooling channel. Furthermore, it is alternatively possible that some rib-like elements in the cooling channel extend into the cooling channel and other rib-like elements project out of the cooling channel. The elevations and valleys may have an identical or alternative geometrical structure and/or design in accordance with the previous description.

The rib-like element can be configured as a rib, where as an alternative to a rib, a pressure area, a depression, a recess, a seam, a bead, ribbing or similar is possible.

In a further aspect, a rib-like element is disposed diagonally to the direction of the cooling channel circulation.

In a further aspect, the piston has at least two weld supports, specifically an external support and a central support that each has at least one weld plane, wherein the weld plane of the upper part and of the lower part are located in the area of the external support and in the area of the central support in the same weld plane or are located in different weld planes.

In a further aspect, the weld plane in the area of the external support and/or in the area of the central support in the piston is executed curved and/or flat.

BRIEF DESCRIPTION OF THE DRAWING

Aspects in accordance with the method and apparatus are shown in the Figures in which:
FIG. 1 shows a piston in cross-section;
FIG. 2 shows the piston in a cross-section rotated by 90°;
FIG. 3 shows the piston in a section B-B;
FIG. 4 shows a further piston in cross-section;
FIG. 5 shows the further piston in a cross-section rotated by 90°;
FIG. 6 shows a further piston in cross-section; and
FIG. 7 shows the further piston in a cross-section rotated by 90°.

DETAILED DESCRIPTION

Various aspects of unmachined pistons 1 for an internal combustion engine are shown in FIGS. 1 to 7. Identical components are given identical reference numerals in the Figures, and different components are given different reference numerals.

First, the features in common of the respective piston 1 in accordance with FIGS. 1 to 7 are shown.

In the aspects in accordance with FIGS. 1 to 7 the respective piston 1 consists of a steel material.

The pistons 1 for an internal combustion engine shown in FIGS. 1 to 7 have a single cooling channel 2. In accordance with FIGS. 1 to 7, the cooling channel 2 is completely circumferential with a constant radial distance around the piston stroke axis 3 of the respective piston 1. The piston 1 further consists of an upper part 4 and a lower part 5. The cooling channel 2 of the piston 1 is formed by means of the upper part 4 and the lower part 5, as the cooling channel 2 is formed between upper part 4 and lower part 5 in accordance with FIGS. 1 to 7.

The upper part 4 and the lower part 5 have been produced respectively by means of a forging process.

The piston 1 in accordance with FIGS. 1 to 7 at least one supply orifice for coolant (not shown), for example engine oil, and at least one drain orifice (not shown) for the coolant. Using the inlet orifice, it is possible to introduce coolant, from the internal combustion engine for example, into the cooling channel 2 so that the coolant flows through the cooling channel 2 and then exits again from the outlet orifice after cooling the piston 1.

The piston 1 further has piston skirts in the area of the lower part 5 in accordance with FIGS. 1 to 7.

The piston 1 furthermore has two weld supports in accordance with FIGS. 1 to 7 that have a respective weld plane. In FIGS. 1 to 7, the piston 1 has a weld support in the form of an external support 7a and a weld support in the form of a central support 7b. The external support 7a is located in accordance with FIGS. 1 to 7 in the area of the subsequent ring zone of the piston 1, and the central support 7b is located below a combustion bowl 6 indicated by a broken line in the area around the piston stroke axis 3. The external support 7a is completely radially circumferential at a constant distance around the piston stroke axis 3 so that both the upper part 4 and the lower part 5 have one side of the completely circumferential external support 7a. The two sides correspond to each other so that the upper part 4 is placed on the lower part 5 to join on the respective side. The central support 7b is configured as a surface around the piston stroke axis 3, wherein the upper part 4 and the lower part 5 each forms one side of the surface. When the sides of upper part 4 and lower part 5 are placed on top of each other in the area of the external support 7a, the corresponding sides of upper part 4 and lower part 5 are placed on top of each other for joining in the area of the central support 7b.

The upper part 4 and the lower part 5 of the piston 1 are connected together by means of a joining process, in the aspect by means of a friction welding process, at the two weld supports, that is to say, external support 7a and central support 7b of the piston 1, in the area of the appropriate weld plane whereby a friction weld seam is formed in the area of the external support 7a and the central support 7b. The piston 1 has only three friction weld seams 8 as a result of the geometric shape of the weld support in accordance with FIGS. 1 to 7.

In what follows, additional features of the piston 1 are described in accordance with the FIGS. 1 to 7 in which the pistons 1 differ from each other.

The piston 1 in accordance with FIGS. 1 to 3 has several rib-like elements in the cooling channel 2 in the area of the upper part 4 of the piston 1. In the aspect in accordance with FIGS. 1 to 3, the rib-like elements are configured as a rib 9, where the upper part 4 has 12 ribs 9. In accordance with FIG. 3 the ribs 9 are arranged transversely to the direction of circulation of the cooling channel 2 with a constant distance to the piston stroke axis 3 so that, with reference to the piston stroke axis 3 of the piston 1, a star-shaped arrangement of the ribs 9 results. The ribs 9 are arranged at an equal distance from each other so that the ribs 9 create an identical geometric structure. In accordance with FIGS. 1 and 2, the ribs 9 in the upper part 4 of the piston 1 are curved towards the cooling channel 2 so that the ribs protrude slightly from the upper part 4 in the shape of formed elevations and create a type of ribbing in the cooling channel 2. The ribs 9 have an identical design.

In accordance with FIGS. 1 and 2, the weld plane of the upper part 4 and the weld plane of the lower part 5 of the piston 1 in the area of the external support 7a and in the area of the central support 7b are located on the respective contact surface in the same weld plane so that a single, common weld plane is formed from both weld planes. In so doing, the weld plane in the area of the external support 7a is flat, and the weld plane in the area of the central support 7b in the piston 1 is curved.

An alternative piston 1 is shown in FIGS. 4 and 5, where the piston 1 does not have any rib-like element in accordance with FIGS. 4 and 5. The weld plane of the upper part 4 and of the lower part 5, in accordance with FIGS. 4 and 5, are located in the area of the external support 7a and in the area of the central support 7b in the same weld plane on the respect contact surface. Further, in accordance with FIGS. 4 and 5, the weld plane in the area of the external support 7a is flat, and the weld plane in the area of the central support 7b in piston 1 is curved.

An additional alternative piston 1 in accordance with the invention is shown in FIGS. 4 and 5, where the piston 1 in accordance with FIGS. 4 and 5 does not have a rib-like element. The weld plane of the upper part 4 and the lower part 5 are, in accordance with FIGS. 4 and 5, located in the area of the external support 7a and in the area of the central support 7b at the respective contact surface in the same weld plane. In addition, in accordance with FIGS. 4 and 5, the weld plane in the case of the piston 1 is flat in the area of the external support 7a and curved in the area of the central support 7b.

A further alternative piston 1 is shown in FIGS. 6 and 7, where the piston 1 in accordance with FIGS. 6 and 7 does not have any rib-like element. The weld planes of the upper part 4 and the lower part 5 are located in different weld part planes in the area of the external support 7a and in the area of the central support 7b at the respective contact surface because a step results between the weld plane of the external support 7a and the weld plane of the central support 7b in the area of the cooling channel. Consequently, as a result of the step, the two weld planes are offset to each other. In accordance with FIGS. 6 and 7, the weld plane in the area of the external support 7a is flat, and the weld plane in the area of the central support 7b is curved in the piston. In addition, the contour of the finished piston 1 is indicated in FIGS. 6 and 7 by the broken line.

Hereafter, a process for the production of a piston 1 for an internal combustion engine with a cooling channel 2 is described. As an example, the piston 1 shown in FIGS. 1 to 3 is produced. The piston 1 in this aspect is produced from an upper part 4 and a lower part 5 in accordance with FIGS. 1 to 3. The cooling channel 2 of the piston 1 is formed using upper part 4 and lower part 5, as shown in FIGS. 4 and 5. In this aspect, the upper part 4 and the lower part 5 respectively of the piston are produced using a forging process.

During the forging of upper part 4 in an area where the cooling channel 2 of the upper part 4 is to be forged in accordance with FIG. 3, several ribs 9 are forged in addition at the same time. The ribs 9 are forged perpendicular to the circulation direction of the cooling channel 2 so that an arrangement of the ribs 9 in accordance with FIG. 3 in the cooling channel 2 of the upper part 4 results following forging. No ribs 9 are forged into the lower part 5 so that the lower part 5 has no ribs 9.

During the forging of the upper part 4 and the lower part 5, additional weld supports are forged at the same time into the respective upper part 4 and the lower part 5. In the embodiment in accordance with FIGS. 1 to 3 an external support 7a and a central support 7b are forged at the same time as the forging of upper part 4 and lower part 5 as a weld support.

The unmachined and forged upper part 4 and the unmachined and forged lower part 5 are then connected at the two weld supports, in this aspect using a friction welding process, to produce the piston 1, where, to achieve this, the corresponding sides of the respective weld support of the upper side 4 and the lower part 5 are placed on top of each other to fit.

In order to join the upper part 4 and the lower part 5, the upper part 4 and the lower part 5 are friction-welded at both weld supports of the upper part 4 and the lower part 5. The two weld supports in accordance with FIGS. 1 and 2 are the external support 7a and the central support 7b in this aspect. Only three friction welding beads 8 are formed during the friction welding at the external support 7a and the central support 7b so that the finished piston 1 has only three friction weld beads 8, in accordance with FIGS. 1 to 3.

In accordance with FIGS. 1 and 2, a friction welding bead 8 is formed in the cooling channel in the boundary area of the central support 7b, a friction welding bead in the cooling channel 2 circumferentially in the boundary area of the external support 7a, and a friction welding bead 8 on the outer side of the piston 1 circumferentially in the boundary area of the external support 7a.

The friction welding itself takes place in a single weld plane in the form of a friction welding plane. To do this, the upper part 4 and the lower part 5 in the area of the external support 7a and in the area of the central support 7b form a weld plane, wherein, in accordance with FIGS. 1 to 3 and previous explanations, the upper part 4 and the lower part 5 are friction welded in the area of the external support 7a and the area of the central support 7b.

While the upper part 4 and the lower part 5 were being produced by the friction welding process, the respective weld planes in the area of the external support 7a and in the area of the central support 7b were executed respectively with a different geometric shape. In accordance with FIGS. 1 and 2, the weld plane in the area of the external support 7a was executed flat during the production of the upper part 4 and the lower part 5 and the weld plane in the area of the central support 7b was executed as curved during the production of the upper part 4 and the lower part 5.

After the upper part 4 and the lower part 5 have been friction welded into the piston 1 shown in FIGS. 1 to 3, the piston is machined further in the area of the external support 7a in the outer area of the piston 1 so that three ring grooves, for example, are formed in the area around the external support 7a. During this machining, the friction welding bead 8 running around the outside of the piston 1 is removed from the piston 1. It is additionally possible, for example, to introduce a piston pin bore in the area of the lower part of the piston 5 and to continue finish machining the piston skirts of the lower part of the piston 5. It is additionally possible to introduce a combustion bowl 6 into the piston 1 in accordance with the combustion bowl 6 indicated by the broken line in accordance with FIGS. 1 and 2.

The finished piston 1 is then operated in an internal combustion engine and cooled during operation by means of coolant in its cooling channel 2.

The piston 1 in accordance with FIGS. 4 and 5 and the piston 1 in accordance with FIGS. 6 and 7 are produced appropriately in each instance. No rib 9 is forged at the time of the forging of upper part 4 and lower part 5 of the particular piston 1 in accordance with FIGS. 4 to 7. In addition, the weld plane of piston 1 in accordance with FIGS. 6 and 7 has a step matching the previous description so that friction welding is performed on different weld planes during production of the piston 1 in accordance with FIGS. 6 and 7. The piston 1 in accordance with FIGS. 4 and 5 is welded on an identical weld plane. In addition, it is possible to introduce a combustion bowl 6 into the respective piston 1 as shown by the combustion bowl indicated by the broken line shown in FIGS. 4 to 7.

The disclosure relates to a method for producing and a steel piston produced using this method that is joined from two parts (upper part and lower part). At least the upper part, but also both parts, are produced in a forging process.

The upper part and the lower part are produced in a forging process in such a manner that they have contact surfaces facing each other that are connected using a suitable joining process, specifically using friction welding. To achieve this, the upper part and/or the lower part have a radially circumferential recess that forms a cooling channel after the upper part and the lower part are joined. A cooling channel of this type is provided with an inlet and a drain so that a cooling medium, specifically engine oil, can circulate in an intrinsically known way in the radially circumferential, closed cooling channel to cool the surrounding areas, specifically the piston crown. In order to improve the cooling effect, it has already become known in the prior art to introduce several adjacent drill holes into the crown of the cooling channel which is upward facing, that is to say, towards the combustion chamber, into which the coolant can penetrate and thus improve the cooling effect by reason of an enlarged surface area. The penetration of the plurality of drill holes has, however, the disadvantage that additional manufacturing steps are required, and these drill holes weaken the severely stressed piston crown.

It is desirable to improve a generic piston to the effect that, while simultaneously improving the cooling effect, the strength of the piston crown is not only retained but is likewise increased.

This aspect is achieved by producing the upper part in a forging process and introducing a plurality of rib-like elements into the recess during the shaping process. These rib-like elements extend outwards in a star shape, starting from the piston stroke axis, specifically below the crown of the radially circumferential cooling channel. These ribs enlarge the surface area of the cooling channel because when the surface of the cooling channel is viewed around its circumference a wave shape is created. It does not have to be absolutely a wave shape, but elevations and depressions alternate, in particular identically shaped ones. The transition from an elevation to a depression and conversely is advantageously rounded, but does not have to be. The previously described design of the recess in the upper part can alternatively or supplementally be present in the radially circumferential recess in the lower part. That is to say, the design is either present only in the recess of the upper part or only in the recess of the lower part or in both recesses that are radially circumferential.

After this type of shaping of the radially circumferential recesses in the upper and/or lower part to create rib-like elements, specifically cooling ribs have been produced, the two parts are joined.

As an alternative to the previously described aspect, a joining process, specifically friction welding, a circumferential external support for the piston upper part and the piston lower part is generated in the area of the ring zone, where the ring zone area is subsequently machined after the joining. In addition, a central joint of the piston lower part with the piston upper part is present. It can be, for example, a force-fit connection, a positive locking connection or a bonded connection. By pre-forming the upper part and/or the lower part a circumferential cooling space is created between the central connection of the piston lower part (in particular through the central support) and the circumferential external support. Friction welding beads are produced both internally and externally in the area of the joint plane (weld plane) of the external support and a friction weld bead on the outside of the weld plane of the central support. This is a total of three weld beads. The advantage is that known solutions often have four or six friction weld beads so that this number is reduced. The weld planes of the external support and of the central support may be in one plane or offset. The weld plane itself, specifically the plane of the central support, may be both flat as well as curved or a combination of flat and curved.

Advantageously, friction weld seams occur only at the outer diameter and in the cooling channel. The central support allows the stress-critical friction weld seams to be positioned in non-critical stress planes by varying the weld plane geometry. As a result, steel pistons, if necessary also pistons from a light-alloy material, having a particularly low compression height can be produced particularly advantageously, where at the same time high ignition pressure load resistance with good cooling due to good positioning of the friction weld planes can be implemented. It is also advantageous that an external support and production of a cooling channel is possible with only three friction weld beads. No friction weld bead is formed in the combustion bowl and in the piston crown area below the bowl.

What is claimed:

1. A method for producing a piston having at least one cooling channel for an internal combustion engine that is produced from at least one upper part and a lower part, where the upper part and the lower part of the piston are produced using a forging process, characterized in that during the forging of the upper part in an area of the cooling channel of the upper part in addition at least one rib-like element is forged at the same time and/or during the forging of the lower part in an area of the cooling channel of the lower part in addition at least one rib-like element is forged at the same time, and forging at the same time of the respective upper part and lower part a central weld support continuously, circumferentially and radially extending from the cooling channel radially inward to a piston stroke axis; and joining the upper and lower parts in the central weld area substantially all along the central weld support.

2. A method for producing a piston having at least one cooling channel for an internal combustion engine that are produced from at least one upper part and a lower part, wherein the cooling channel of the piston is formed using the upper part and the lower part, and the upper part and the lower part is produced using a forging process, wherein, during the forging of the upper part in an area of the cooling channel of the upper part additionally, at least one rib-like element, is forged at the same time, and forging at the same time of the respective upper part and the lower part a central weld support continuously, circumferentially and radially extending from the cooling channel radially inward to a piston stroke axis; and joining the upper and lower parts in the central weld area substantially all along the central weld support.

3. The method from claim 2, wherein the rib-like element is forged perpendicular to a direction of circulation of coolant fluid in the cooling channel.

4. The method in accordance with claim 2, further comprising:
an external weld support positioned radially outward of the central weld support, the external and central weld supports forged at the same time as the upper part and the lower part.

5. The method of claim 3 comprising: forming the rib-like element as a rib.

6. The method of claim 5 wherein the rib comprises opposing ends and a protruding edge positioned between the opposed ends and extending into the cooling chamber, the protruding edge having a non-linear portion between the opposed ends.

7. The method in accordance with claim 4, wherein a weld plane in the area of the central weld support comprises a curved portion in a radial direction between the cooling chamber and the piston stroke axis.

8. The method of claim 7 wherein the piston upper part central weld support weld plane curved portion defines a concave cavity along the stroke axis toward a combustion bowl.

9. The method from claim 2 wherein joining the upper and lower part step comprises friction welding.

10. A method for producing a piston for an internal combustion engine having at least one cooling channel, the piston is produced from at least one upper part and one lower part, where the cooling channel of the piston is formed using the upper part and the lower part, and the upper part and the lower part of the piston is produced using a forging process, wherein during the forging of the lower part in an area of the cooling channel of the lower part to be forged at least one rib-like element is forged at the same time, and forging at the same time of the respective upper part and the lower part a central weld support continuously, circumferentially and radially extending from the cooling channel radially inward to a piston stroke axis; and joining the upper and lower parts in the central weld area substantially all along the central weld support.

11. A piston for an internal combustion engine that has at least one cooling channel and includes at least an upper part and a lower part, where the cooling channel of the piston is formed using the upper part and the lower part, and has at least one rib-like element formed in the cooling channel; and
the respective piston upper part and lower part each comprising a complementary central weld support surface continuously and circumferentially extending from the cooling channel radially inward to a piston stroke axis, the piston upper part central weld support surface and the piston lower part central weld support surface defining a circumferential central weld support continuously extending from the cooling channel radially to the piston stroke axis on theand joining of the piston upper and lower parts.

12. The piston from claim 11 wherein the piston is formed of a steel material.

13. The piston in accordance with claim 11, wherein the rib-like element is disposed transversely to a circulation direction of a cooling medium in the cooling channel.

14. The piston in accordance with claim 11, further comprises an external weld support, the external weld support defining a first welding plane and the central weld support defining a second welding plane, the first and second welding planes positioned in one of the same weld plane or a different weld plane respectively.

15. The piston in accordance with claim 14, wherein the central weld support second welding plane comprises a curved portion in a radial direction between the cooling chamber and the piston stroke axis.

16. The piston of claim 15 wherein the piston upper part central weld support surface defines a concave cavity along the stroke axis toward a combustion bowl.

17. The piston of claim 14 wherein the different weld plane comprises the first weld plane positioned at a different height in a direction parallel to the piston stroke axis than the second weld plane.

18. The piston of claim 11 wherein:
the rib-like element is a rib.

* * * * *